(12) United States Patent
Takahashi et al.

(10) Patent No.: US 10,200,562 B2
(45) Date of Patent: Feb. 5, 2019

(54) IMAGING DEVICE

(71) Applicant: OLYMPUS CORPORATION, Hachioji-shi, Tokyo (JP)

(72) Inventors: Masashi Takahashi, Hachioji (JP); Keiji Kunishige, Hachioji (JP); Katsuhisa Kawaguchi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 11 days.

(21) Appl. No.: 15/583,162

(22) Filed: May 1, 2017

(65) Prior Publication Data

US 2017/0331978 A1 Nov. 16, 2017

(30) Foreign Application Priority Data

May 10, 2016 (JP) .................................. 2016-094782

(51) Int. Cl.
*H04N 1/00* (2006.01)
*H04N 1/333* (2006.01)

(52) U.S. Cl.
CPC ......... *H04N 1/333* (2013.01); *H04N 1/00403* (2013.01); *H04N 1/00411* (2013.01); *H04N 1/00424* (2013.01); *H04N 1/00482* (2013.01); *H04N 2201/0081* (2013.01); *H04N 2201/0082* (2013.01)

(58) Field of Classification Search
CPC ............... H04N 1/333; H04N 1/00403; H04N 1/00411; H04N 1/00424; H04N 1/00482; H04N 2201/0081; H04N 2201/0082
See application file for complete search history.

(56) References Cited

U.S. PATENT DOCUMENTS

| | | | | |
|---|---|---|---|---|
| 5,124,807 A | * | 6/1992 | Dunlap | G11B 5/86 360/15 |
| 5,706,388 A | * | 1/1998 | Isaka | H04N 5/775 386/206 |
| 6,137,943 A | * | 10/2000 | Kanda | G11B 27/002 348/705 |
| 7,228,061 B2 | * | 6/2007 | Mori | G11B 27/107 348/E5.099 |

(Continued)

FOREIGN PATENT DOCUMENTS

JP 2007-174693 A 7/2007

*Primary Examiner* — Huy T Nguyen
(74) *Attorney, Agent, or Firm* — Volpe and Koenig, P.C.

(57) ABSTRACT

An imaging device includes: an imaging unit configured to image a subject and generate image data; a display configured to display information including an image corresponding to the image data; a first recording slot mounting a first recording medium for recording the image data; a second recording slot mounting a second recording medium for recording the image data; a recording controller configured to set a recording mode between: an automatic switching mode in which recording of the image data is performed by repeatedly switching between the first and the second recording media in a predetermined order; and a simultaneous recording mode in which recording of the image data to the first and the second recording media is simultaneously performed; and a display controller configured to display setting mode information relating to the recording mode set by the recording controller in a different display mode for each recording mode.

13 Claims, 9 Drawing Sheets

(56) References Cited

U.S. PATENT DOCUMENTS

2006/0018207 A1* 1/2006 Saito .................. H04N 5/23293
369/30.01
2008/0069543 A1* 3/2008 Tsukuda ............... G11B 27/034
386/295

* cited by examiner

FIG.5

| RECORDING MODE | | | RECORDING SLOT | SHARING DISPLAY | USE STATE DISPLAY | CAPTURABLE NUMBERS OF SHEETS |
|---|---|---|---|---|---|---|
| STANDARD | | | 1 | | | RECORDABLE NUMBER OF SHEETS OF 1 |
| | | | 2 | | | RECORDABLE NUMBER OF SHEETS OF 2 |
| | AUTOMATIC SWITCHING | | 1→2 | | | RECORDABLE NUMBER OF SHEETS OF 1+2 |
| | | | ONLY 1 (2 IS ERROR) | | | |
| | | | 2→1 | | | |
| | | | ONLY 2 (1 IS ERROR) | | | |
| SIMUL- TANE- OUS RECOR- DING | INDIVID- UAL RECOR- DING | SAME CAPTURING PRIORITY (INDIVIDUAL[1]) | 1,2 | | | RECORDABLE NUMBER OF SHEETS OF EITHER ONE OF 1 OR 2 WITH SMALLER NUMBER OF SHEETS |
| | | CAPTURING NUMBER OF SHEETS PRIORITY (INDIVIDUAL[2]) | 1,2 | | | RECORDABLE NUMBER OF SHEETS OF EITHER ONE OF 1 OR 2 WITH LARGER NUMBER OF SHEETS |
| | | | ONLY 1 (2 IS ERROR) | | | |
| | | | ONLY 2 (1 IS ERROR) | | | |
| | SAME RECOR- DING | SAME CAPTURING PRIORITY (SAME[1]) | 1,2 | | | RECORDABLE NUMBER OF SHEETS OF EITHER ONE OF 1 OR 2 WITH SMALLER NUMBER OF SHEETS |
| | | CAPTURING NUMBER OF SHEETS PRIORITY (SAME[2]) | 1,2 | | | RECORDABLE NUMBER OF SHEETS OF EITHER ONE OF 1 OR 2 WITH LARGER NUMBER OF SHEETS |
| | | | ONLY 1 (2 IS ERROR) | | | |
| | | | ONLY 2 (1 IS ERROR) | | | |

FIG.11

| RECORDING MODE | RECORDING SLOT | FILE FORMAT |
|---|---|---|
| STANDARD | 1 or 2 | JPEG |
| | | RAW |
| | | JPEG+RAW |
| AUTOMATIC SWITCHING | 1 + 2 | JPEG |
| | | RAW |
| | | JPEG+RAW |
| INDIVIDUAL[1] or INDIVIDUAL[2] | 1 / 2 | JPEG/RAW |
| | | JPEG/JPEG+RAW |
| | | RAW/JPEG |
| | | RAW/JPEG+RAW |
| | | JPEG+RAW/JPEG |
| | | JPEG+RAW/RAW |
| SAME[1] | 1 + 2 | JPEG |
| | | RAW |
| | | JPEG+RAW |
| SAME[2] | 1 / 2 | JPEG |
| | | RAW |
| | | JPEG+RAW |

IMAGING DEVICE

CROSS-REFERENCE TO RELATED APPLICATIONS

This application is based upon and claims the benefit of priority from Japanese Patent Application No. 2016-094782, filed on May 10, 2016, the entire contents of which are incorporated herein by reference.

BACKGROUND

The present disclosure relates to an imaging device which images a subject and generates image data.

In the related art, an imaging device, which is capable of recording captured video data in a plurality of recording media, has been known (for example, see JP 2007-174693 A). In the imaging device, when there is no available capacity in a recording medium in the middle of recording image data, a saving destination is switched to a different recording medium to continue the recording of image data.

Meanwhile, among users of the imaging device, there is a demand for saving of the same image data in different file formats or saving a plurality of the same data for backup. In the above-described technique, however, it is difficult for a user to flexibly and easily set a recording mode of image data with respect to the plurality of recording media.

SUMMARY

An imaging device according to one aspect of the present disclosure includes: an imaging unit configured to image a subject and generate image data; a display configured to display information including an image corresponding to the image data; a first recording slot mounting a first recording medium for recording the image data; a second recording slot mounting a second recording medium for recording the image data; a recording controller configured to set a recording mode between: an automatic switching mode in which recording of the image data is performed by repeatedly switching between the first and the second recording media in a predetermined order; and a simultaneous recording mode in which recording of the image data to the first and the second recording media is simultaneously performed; and a display controller configured to display setting mode information relating to the recording mode set by the recording controller in a different display mode for each recording mode.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 5 is a view illustrating a correspondence among a recording slot, a sharing display icon, a use state display icon, and the capturable number of sheets for each recording mode set in the imaging device according to the embodiment of the disclosure;

FIG. 11 is a view illustrating various combinations that may be selected in three items.

DETAILED DESCRIPTION

Hereinafter, modes for carrying out the present disclosure (hereinafter, referred to as "embodiment(s)") will be described with reference to the appended drawings.

Figure 1:
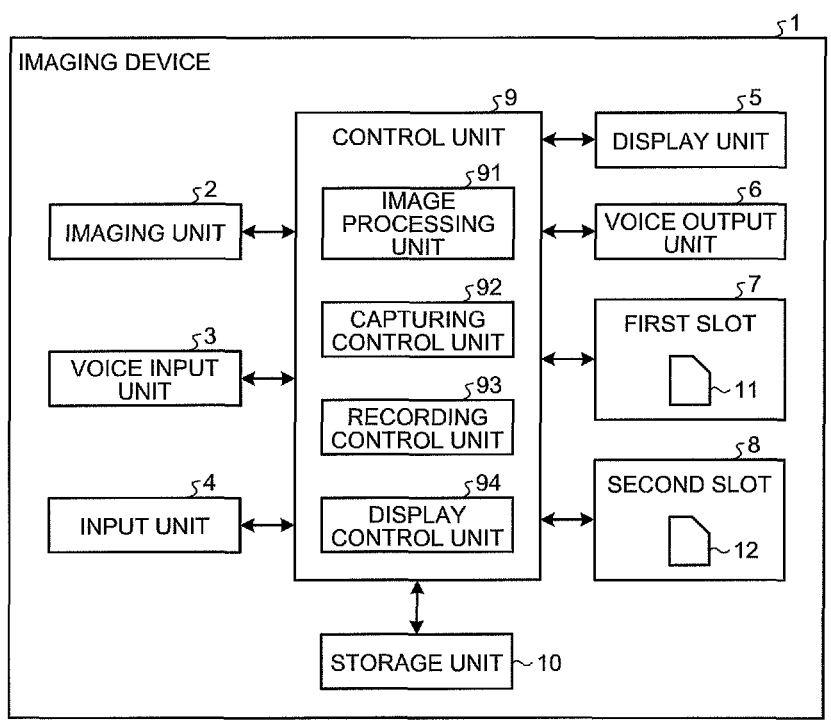
FIG. 1 is a block diagram illustrating a functional configuration of an imaging device according to an embodiment of the disclosure.

FIG. 1 is a block diagram illustrating a functional configuration of an imaging device according to an embodiment of the disclosure. An imaging device 1 illustrated in the drawing includes: an imaging unit 2 which images a subject based on an imaging parameter and generates image data; a voice input unit 3 which is configured using a microphone or the like to collect external sound and generate voice data; an input unit 4 which receives input of various operation instruction signals; a display unit 5 which displays various types of information including an image that corresponds to the image data generated by the imaging unit 2; a voice output unit 6 which is configured using a speaker or the like to output voice; a first slot 7 and a second slot 8 to which each recording medium to record the image data may be mounted; a control unit (controller) 9 which collectively controls an operation of the imaging device 1; and a storage unit 10 which stores information on the operation of the imaging device 1 and the like.

The imaging unit 2 includes an optical system, which is configured using one or a plurality of lenses and collects light from the subject, and an imaging element which performs photoelectric conversion on the light imaged via the optical system and generates an electrical imaging signal. The optical system is configured using one or a plurality of various optical elements. The imaging element is configured using an image sensor such as a complementary metal oxide semiconductor (CMOS) and a charge coupled device (CCD).

The input unit 4 is configured using a touch panel which is provided to be laminated on a screen display area of the display unit 5, a release switch which is provided on a body surface of the imaging device 1 and receives instruction input of still image capturing, and user interfaces such as various switches and various buttons to receive input of start and end instructions of video capturing.

The display unit 5 displays various types of information including operation information of the imaging device 1 and information which relates to the capturing operation. The display unit 5 may perform live view display to sequentially display images corresponding to image data, successively generated by the imaging unit 2 in a time-series manner, playback display to play back image data stored in the two recording media, mounted to each of the first slot 7 and the second slot 8, and the like. The display unit 5 is configured using a display panel made of liquid crystal or organic electro luminescence (EL).

The first slot 7 and the second slot 8 are recording slots to which a computer-readable recording medium, such as a memory card, may be mounted in a detachable manner. FIG. 1 illustrates a case where a recording medium 11 is mounted to the first slot 7, and a recording medium 12 is mounted to the second slot 8. The first slot 7 and the second slot 8 may have the same specification as an interface, such as write speed with respect to the recording medium or different specifications. It is a matter of course that the recording media 11 and 12 have the specification that may be mounted to the first slot 7 and the second slot 8, respectively, and perform write normally. In addition, the recording media 11 and 12 may have the same recording capacity or have different recording capacities. Hereinafter, when the recording medium 11 is simply referred, it is assumed the state of being mounted to the first slot 7. In addition, when the recording medium 12 is simply referred, it is also assumed the state of being mounted to the second slot 8.

The control unit 9 includes an image processing unit 91 which performs various types of image processing with respect to image data (RAW data) generated by the imaging unit 2 to generate the processed image data, a capturing control unit (capturing controller) 92 which controls a capturing operation performed by the imaging unit 2, a display control unit (display controller) 94 which controls display of an image and the like on the display unit 5, and a recording control unit (recording controller) 93 which controls recording of the image data generated by the imaging unit 2.

The image processing unit 91 performs at least a part of image processing among optical black subtraction processing, white balance (WB) adjustment processing, synchronization processing (when an imaging element of the imaging unit 2 has a Bayer array color filter), color matrix calculation processing, gamma correction processing, color playback processing, edge enhancement processing, and the like. The image processing unit 91 compresses the image data after being subjected to the above-described various types of processing according to a predetermined still image or video format (file format) and outputs the compressed data. Examples of the still image format may include JPEG, Exif, and the like, and example of the video format may include MPEG-4 AVC/H.264, AVCHD and the like.

The recording control unit 93 performs setting of a recording mode and the recording control of the image data depending on the set recording mode the recording mode. The recording control unit 93 executes a process of setting the recording mode when the input unit 4 receives input of a mode setting signal. In addition, the recording control unit 93 calculates the amount of recordable data of the imaging device 1 determined depending on the recording mode.

The recording modes that may be set by the recording control unit 93 are roughly a standard mode, an automatic switching mode, and a simultaneous recording mode. Hereinafter, the respective recording modes will be described.

The standard mode is a mode in which image data is recorded only to the recording medium mounted to any one of the recording slots.

The automatic switching mode is a mode in which recording is constantly performed by automatically and repeatedly switching recording of image data, in a predetermined order, to the two recording media each mounted to the two recording slot.

The simultaneous recording mode is a mode in which recording is performed simultaneously to the recording media 11 and 12 in parallel. The simultaneous recording mode is further divided into an individual recording mode and a same recording mode. The individual recording mode is a mode in which image data is recorded according to setting of different file formats with respect to the two recording media 11 and 12. On the contrary, the same recording mode is a mode in which image data in the same format is recorded with respect to the two recording media 11 and 12.

Any of the same capturing priority mode and the capturing number of sheets priority mode may be set in each of the individual recording mode and the same recording mode. The same capturing priority mode is a mode in which recording of the same image data to, the two recording media 11 and 12 is prioritized. On the contrary, the capturing number of sheets priority mode is a mode in which an increase of a capturing number of sheets that may be recorded at least one of the recording media is prioritized.

In the following description, the individual recording mode and the same capturing priority mode will be referred to as an "individual [1] mode", and the individual recording mode and the capturing number of sheets priority mode will be referred to as an "individual [2] mode". In addition, the same recording mode and the same capturing priority mode will be referred to as a "same [1] mode", and the same recording mode and the capturing number of sheets priority mode will be referred to as a "same [2] mode".

The display control unit 94 displays setting mode information relating to the recording mode set by the recording control unit 93 on the display unit 5 in a different state depending on the recording mode. A specific example of the setting mode information will be described later.

The control unit 9 having the above-described functional configuration is configured using a general-use processor such as a central processing unit (CPU).

The storage unit 10 temporarily stores information in the middle of being processed by the imaging device 1, and stores various programs for the operation of the imaging device 1. The storage unit 10 is configured using a volatile memory such as a random access memory (RAM) and a non-volatile memory such as a read only memory (ROM).

Figure 2:
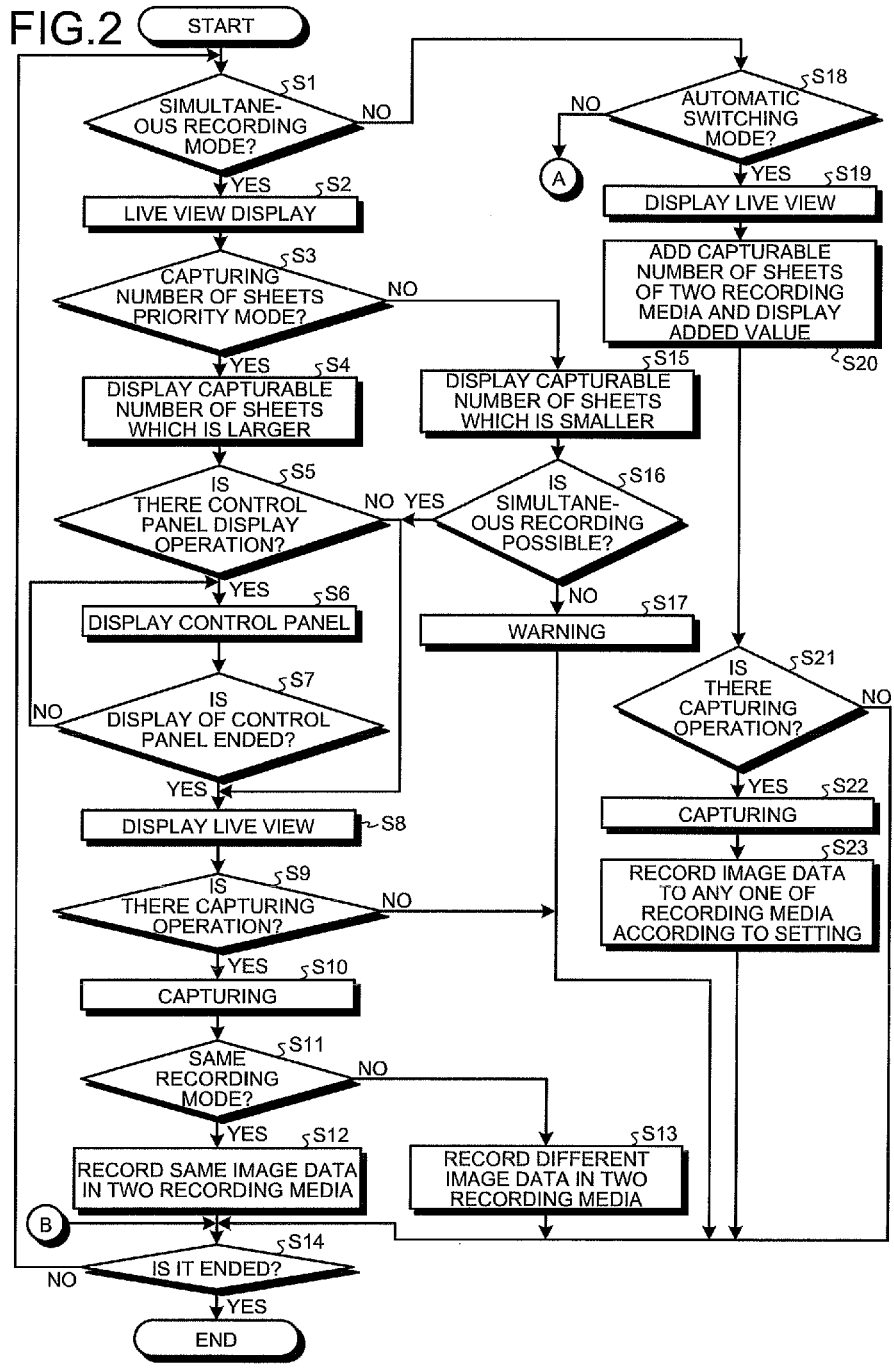
FIG. 2 is a flowchart (1) illustrating the overview of a process of recording image data that is performed by the imaging device according to the embodiment of the disclosure.
Figure 3:
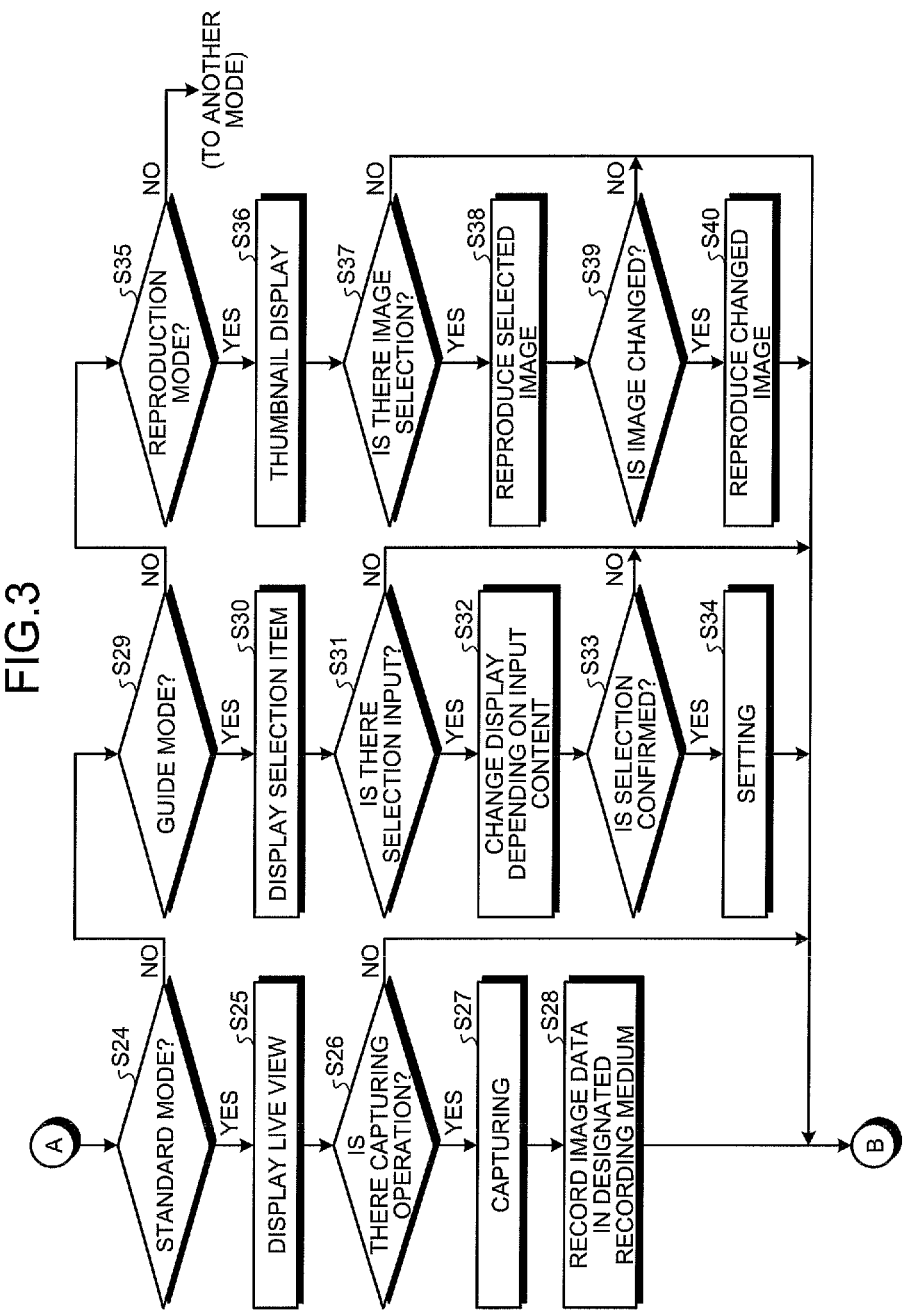
FIG. 3 is a flowchart (2) illustrating the overview of the process of recording image data that is performed by the imaging device according to the embodiment of the disclosure.

FIGS. 2 and 3 are flowcharts illustrating the overview of the process of recording the image data performed by the imaging device 1. First, the description will be given with reference to FIG. 2. When the imaging device 1 is set to the simultaneous recording mode (Step S1: Yes), the display control unit 94 displays a live view image corresponding to the image data successively generated by the imaging unit 2 on the display unit 5 (Step S2).

Figure 4:
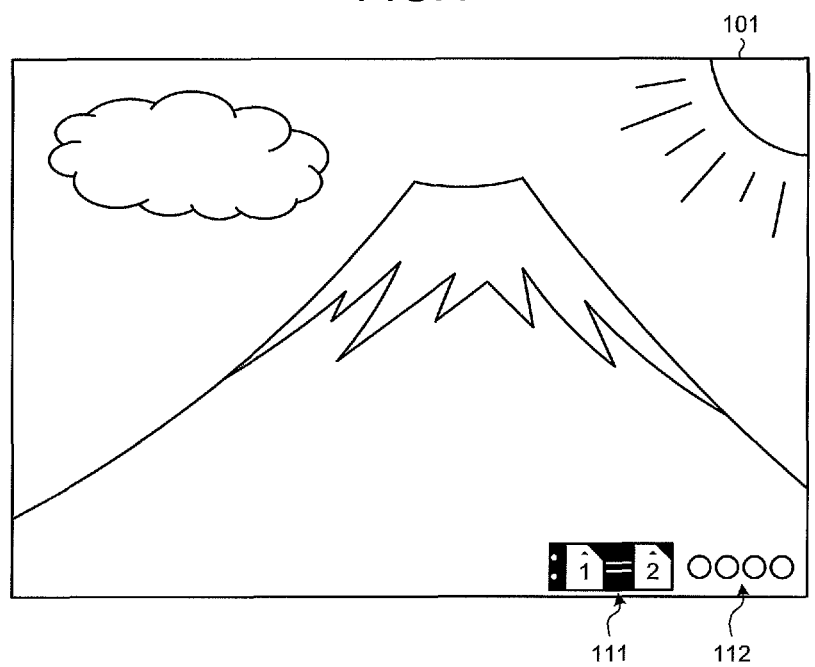
FIG. 4 is a view illustrating a display example of a live view image which is displayed by a display unit when the imaging device according to the embodiment of the disclosure is set to a capturing number of sheets priority mode.

When the imaging device 1 is set to the capturing number of sheets priority mode in the simultaneous recording mode (Step S3: Yes), the display control unit 94 compares each recordable number of sheets (capturable number of sheets) of the two recording media 11 and 12, and displays the recordable number of sheets which is larger on the display unit 5 as information on recordable data amount (data amount information) (Step S4). FIG. 4 is a view illustrating a display example of the live view image displayed by the display unit 5 in this case. In a live view image 101 illustrated in the drawing, a use state display icon 111 and a data amount information 112 are displayed side by side, as the setting mode information, at a lower right edge end portion on a screen in the state of being superimposed on the image imaged by the imaging unit 2. Incidentally, the data amount information 112 is schematically displayed as "○○○○" in FIG. 4, but it is a matter of course that a specific number of the capturable number of sheets is displayed in an actual use.

The use state display icon 111 is determined for each of the set recording modes. The use state display icon 111 illustrated in FIG. 4 is an icon which indicates any recording slot that is valid in any recording mode, that is, that any recording slot to which the recording medium is mounted and recording is being performed and any recording mode that is being set. The case illustrated in FIG. 4 illustrates that recording is simultaneously performed to the recording media 11 and 12 mounted to the first slot 7 and the second slot 8, respectively, in the same [2] mode.

FIG. 5 is a view illustrating a correspondence among the recording slot, a sharing display icon, the use state display icon (setting mode information), and the capturable number of sheets (information on the recordable data amount) for each recording mode set in the imaging device 1. Hereinafter, a description will be given regarding display content of the use state display icon 111 and the data amount information 112 corresponding to the respective recording modes with reference to FIG. 5. Incidentally, the sharing display icon will be described later.

The use state display icon 111 in the standard mode displays a picture (with a recording slot number) schematically illustrating a recording medium as the information relating to a recording slot in the middle of recording. The data amount information 112 in this case is the recordable number of sheets of the recording medium mounted to the recording slot that is being used. Incidentally, it is a matter of course that the recordable number of sheets differs depending on a file format of image data to be recorded.

The use state display icon 111 in the automatic switching mode has a state where pictures (with respective recording slot numbers) of the two recording media each corresponding to the two recording slots are shifted and overlap each other. To be specific, the front side corresponds to the recording slot in the middle of recording, and the back side corresponds to the recording slot that is not in the middle of recording based on a predetermined recording order. A dot pattern put in a picture of a recording medium on the back side means that recording will be continued by being switched to the corresponding recording medium. On the other hand, a hatching pattern put in a picture of a recording medium on the back side indicates that a recording slot thereof is under an unrecordable situation (error). The unrecordable situation used herein includes a situation where it is difficult to perform recording of a recording medium mounted to the recording slot any more.

For example, when image data has been recorded in the recording medium 11 under the setting in which recording of image data is performed in the order of the first slot 7 and the second slot 8, the use state display icon displayed by the display unit 5 is an icon that displays a picture corresponding to the first slot 7 on the front side and displays a picture corresponding to the second slot 8 on the back side with the dot pattern. Thereafter, the use state display icon displayed by the display unit 5 under a situation where the recording to the recording medium 11 has been completed and image data is being recorded to the recording medium 12 is an icon that displays the picture corresponding to the second slot 8 on the front side and displays the picture corresponding to the first slot 7 on the back side with the hatching.

The data amount information 112 in the automatic switching mode is a total recordable number of sheets of the two recording media 11 and 12.

Incidentally, the dot pattern or the hatching pattern illustrated in FIG. 5 is mere a display example, and it is possible to express the same meaning as the above-described configurations using different colors. In addition, the picture corresponding to the recording slot under the unrecordable situation may be configured to flicker or displayed using a picture smaller than the picture of the recording slot in the middle of recording, instead of using the icon in which the two pictures are shifted and overlap each other.

In the use state display icon 111 indicating the individual [1] and individual [2] modes, the pictures of the two recording media corresponding to the two recording slots are arranged side by side, and the slash (/) is illustrated between the both. In addition, the number of white dots illustrated at a left end portion of the icon is different in order to distinguish the individual [1] and the individual [2]. Herein, the hatching pattern put in the picture of the recording medium also indicates that the recording medium is under an unrecordable situation (error). The data amount information 112 in the individual [1] mode is either one of smaller between the recordable numbers of sheets of the two recording media. In addition, the data amount information 112 in the individual [2] mode is either one of the two recording media with larger recordable numbers of sheets.

In the use state display icon 111 indicating the same [1] and the same [2] modes, the pictures of the two recording media corresponding to the two recording slots are illustrated side by side, and the equal sign (=) is illustrated between the both. In addition, the number of dots illustrated at a left end portion of the icon is different in order to distinguish the same [1] and the same [2]. Herein, the hatching pattern in the picture of the recording medium has the same meaning as described above. The data amount information 112 in the same [1] mode is a value which is smaller between the recordable numbers of sheets of the two recording media. In addition, the data amount information 112 in the same [2] mode is a value which is larger between the recordable numbers of sheets of the two recording media.

Incidentally, the description has been given assuming the case of still image capturing herein, and capturable time may be displayed as the data amount information 112 in the case of video capturing. In addition, the recordable data amount may be directly displayed as the data amount information 112 in the case of enabling the recording mode to be set without distinguishing the still image and the video.

After Step S4, when the input unit 4 receives input of an instruction signal that instructs display of a control panel (Step S5: Yes), the display control unit 94 displays the control panel on the display unit 5 (Step S6). When the input unit 4 has not received the input of the instruction signal that instructs the display of the control panel in Step S5 (Step S5: No), the imaging device 1 is shifted to Step S8 to be described later.

Figure 6:
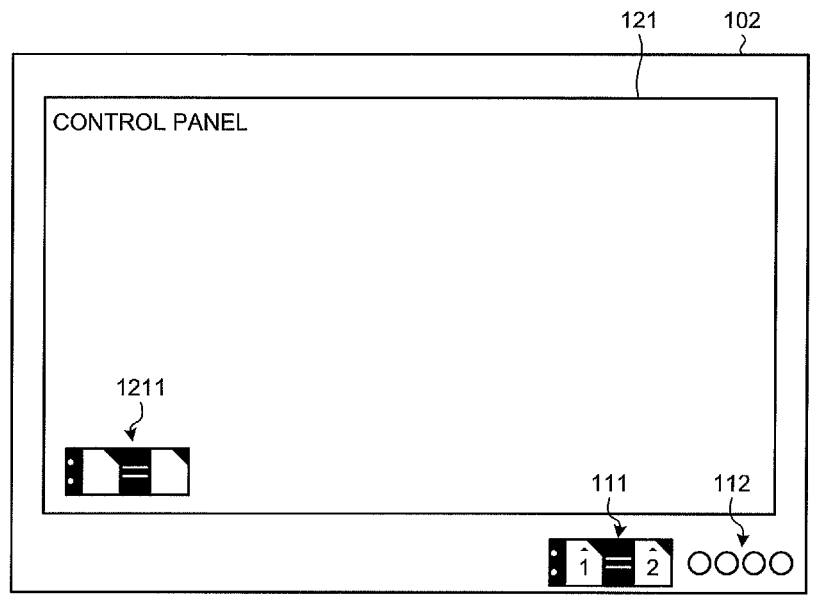
FIG. 6 is a view illustrating a display example of a control panel on the display unit.

FIG. 6 is a view illustrating a display example of the control panel on the display unit 5. A control panel display image 102 illustrated in the same drawing displays a control panel 121. A sharing display icon 1211 indicating sharing of the recording mode of the two recording slots in the set mode is displayed at a lower left side of the control panel 121. The sharing display icon 1211 has display content obtained by simplification of the use state display icon 111 as illustrated in FIG. 5. The sharing display icon 1211 illustrates sharing content of recording depending on the recording modes of the two recording media 11 and 12. The sharing display icon 1211 displays the same icon for each of the recording modes (the standard, the automatic switching, the individual [1], the individual [2], the same [1], and the same [2]). Incidentally, FIG. 6 does not illustrate other content that is displayed in the control panel 121. For example, a file format of image data to be recorded to each of the recording medium 11 and the recording medium 12 may be displayed in the control panel 121. The use state display icon 111 and the data amount information 112 are displayed at a lower right side of the control panel display image 102, which is similar to the live view image 101.

After Step S6, when the input unit 4 receives input of an instruction signal for end of display of the control panel (Step S7: Yes), the display control unit 94 causes the display unit 5 to perform the live view display (Step S8). On the other hand, when the input unit 4 has not received the input of the instruction signal for end of display of the control panel (Step S7: No), the imaging device 1 returns to Step S6.

After Step S8, when the input unit 4 receives input of an instruction signal for capturing (Step S9: Yes), the capturing control unit 92 causes the imaging unit 2 to execute capturing (Step S10). In this case, the image processing unit 91 performs predetermined image processing with respect to the image data (RAW data) generated by the imaging unit 2. When the input unit 4 has not received the input of the instruction signal for capturing in Step S9 (Step S9: No), the imaging device 1 is shifted to Step S14 to be described later.

After Step S10, when the imaging device 1 is set to the same recording mode (Step S11: Yes), the recording control unit 93 records the same image data in the two recording media 11 and 12 (Step S12). On the other hand, when the imaging device 1 is not set to the same recording mode (Step S11: No), that is, when the imaging device 1 is set to the individual recording mode, the recording control unit 93 records different image data in the two recording media 11 and 12 (Step S13). The different image data used herein means image data having the same imaged content but having different file formats, and for example, RAW data and JPEG data.

Thereafter, when the input unit 4 receives input of an end instruction signal such as power-off (Step S14: Yes), the imaging device 1 ends a series of processes. On the other hand, when the input unit 4 has not received the input of the end instruction signal (Step S14: No), the imaging device 1 returns to Step S1.

When the imaging device 1 is not set to the capturing number of sheets priority mode in Step S3 (Step S3: No), that is, when being set to the same capturing priority mode, the recording control unit 93 calculates each capturable number of sheets of the two recording media 11 and 12, and the display control unit 94 displays the capturable number of sheets which is smaller on the display unit 5 as the data amount information 112 (Step S15). Thereafter, when it is under the simultaneously recordable state (Step S16: Yes), the imaging device 1 is shifted to Step S8.

When it is not under the simultaneously recordable state in Step S16 (Step S16: No), the display control unit 94 displays warning on the display unit 5 (Step S17). Thereafter, the imaging device 1 is shifted to Step S14. Incidentally, the voice output unit 6 may output the warning using voice instead of the configuration where the display unit 5 displays the warning.

Next, a description will be given regarding a case where the imaging device 1 is not set to the simultaneous recording mode (Step S1: No) but set to the automatic switching mode (Step S18: Yes). In this case, the display control unit 94 displays the live view image on the display unit 5 (Step S19).

Next, the recording control unit 93 adds the capturable numbers of sheets of the recording medium 11 and the recording medium 12, and the display control unit 94 displays this added result on the display unit 5 as the data amount information 112 (Step S20).

Thereafter, when the input unit 4 receives input of the instruction for capturing (Step S21: Yes), the capturing control unit 92 causes the imaging unit 2 to execute capturing (Step S22). On the other hand, when the input unit 4 has not received the input of the instruction for capturing (Step S21: No), the imaging device 1 is shifted to Step S14.

After Step S22, the recording control unit 93 records image data in any one of the recording media based on the set recording order (Step S23). Thereafter, the imaging device 1 is shifted to Step S14. Incidentally, it may be configured such that the display control unit 94 displays warning on the display unit 5 when it is difficult to perform the recording of image data in the two recording media.

A description will be given regarding a process in the case of being not set to the automatic switching mode in Step S18 (Step S18: No) with reference to the flowchart in FIG. 3. In this case, when the imaging device 1 is set to the standard mode (Step S24: Yes), the display control unit 94 displays the live view image on the display unit 5 (Step S25).

Thereafter, when the input unit 4 is received the input of the instruction signal for capturing (Step S26: Yes), the capturing control unit 92 causes the imaging unit 2 to execute capturing (Step S27). On the other hand, when the input unit 4 has not received the input of the instruction signal for capturing (Step S26: No), the imaging device 1 is shifted to Step S14.

After Step S27, the recording control unit 93 records image data to the designated recording medium (Step S28). Thereafter, the imaging device 1 is shifted to Step S14.

Next, a description will be given regarding a case where the imaging device 1 is not set to the standard mode (Step S24: No) but set to a guide mode (Step S29: Yes). The guide mode is a mode in which information for setting is displayed to set the recording mode. The shift from the recording mode to the guide mode is implemented, for example, when a user touches an area where the use state display icon 111 and the data amount information 112 are displayed on a screen of the display unit 5 and inputs a shift instruction signal.

Figure 7:
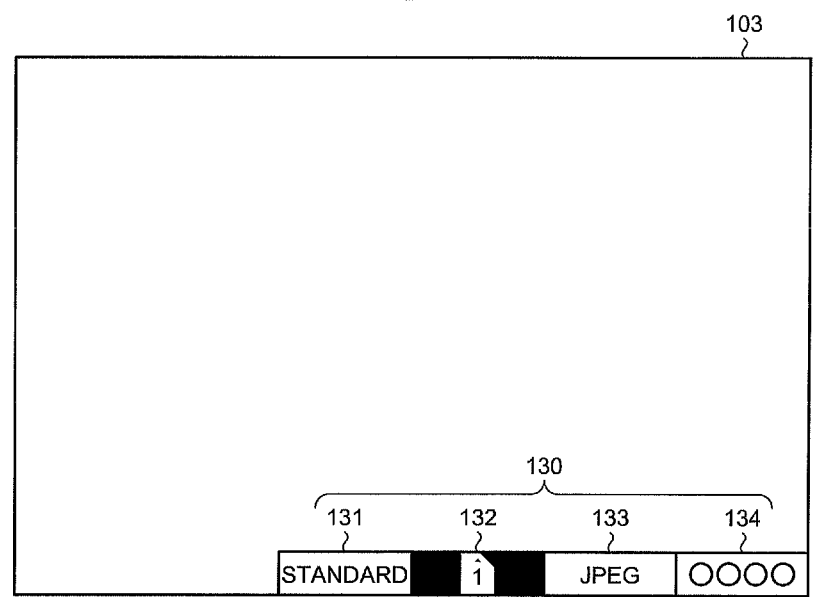
FIG. 7 is a view illustrating a display example of selection items on the display unit.

When it is set to the guide mode (Step S29: Yes), first, the display control unit 94 causes the display unit 5 to display selection items as the information for setting of the recording mode (Step S30). FIG. 7 is a view illustrating a display example of the selection items on the display unit 5. A selection item display image 103 illustrated in the drawing includes a selection item display section 130 including four selection items on a lower right side of the screen. The selection item display section 130 is configured of a recording mode display section 131 indicating a type of the recording mode, a recording slot display section 132 indicating a type of the recording slot that is valid, a file format display section 133 indicating a file format of image data, and a capturable number of sheets display section 134 indicating a capturable number of sheets determined depending on a combination of the recording mode, the recording slot and the file format. FIG. 7 exemplifies a case where the recording mode display section 131 displays the "standard", the recording slot display section 132 displays the first slot 7 (displayed as "1"), and the file format display section 133 displays "JPEG". Incidentally, the case of the still image is assumed in FIG. 7, but it is also possible to set the guide mode even in the case of the video in the same manner. In such a case, the file format may be set to "MPEG" or the like and the capturable time may be displayed instead of the capturable number of sheets.

Figure 8:
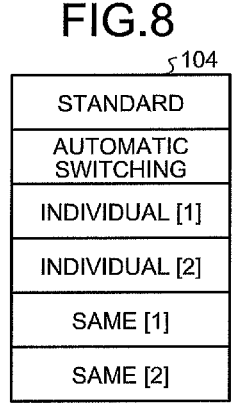
FIG. 8 is a view illustrating a display example of selection candidates of the recording mode on the display unit.

Thereafter, when input of selection is performed (Step S31: Yes), the display control unit 94 changes display depending on the input content (Step S32). At this time, when the input unit 4 receives any selection input among the four selection items, the display control unit 94 displays a list of candidates that may be selected according to the selection item on the display unit 5. FIG. 8 is a view illustrating a display example of selection candidates of the recording mode on the display unit 5. A candidate display image 104 illustrated in FIG. 8 displays six candidates of "standard", "automatic switching", "individual [1]", t "individual [2]", "same [1]", and "same [2]".

Figure 9:
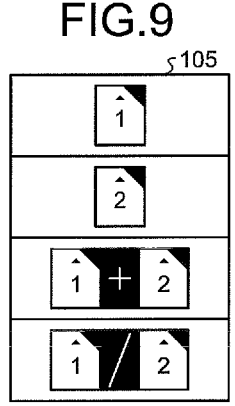
FIG. 9 is a view illustrating a display example of selection candidates of the recording slot on the display unit.

FIG. 9 is a view illustrating a display example of the selection candidate of the recording slot on the display unit 5. A candidate display image 105 illustrated in the drawing displays four candidates of "1", "2", "1+2", and "1/2". Incidentally, the description is given using only the number illustrated in the middle of the picture of the recording medium in the present specification. Among them, the icon "1+2" is displayed in a case where the automatic switching mode or the same [1] mode is selected. In addition, the icon "1/2" is displayed in a case where individual [1] mode, individual [2] mode, or the same [2] mode is selected.

Figure 10:
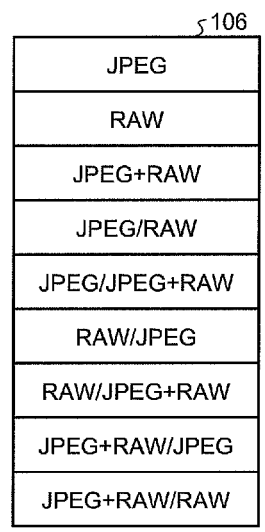
FIG. 10 is a view illustrating a display example of selection candidates of a file format on the display unit.

FIG. 10 is a view illustrating a display example of selection candidates of the file format on the display unit 5. A candidate display image 106 illustrated in the drawing displays nine candidates of "JPEG", "RAW", "JPEG+ RAW", "JPEG/RAW", "JPEG/JPEG+RAW", "RAW/ JPEG", "RAW/JPEG+RAW", "JPEG+RAW/JPEG", and "JPEG+RAW/RAW". Among them, for example "JPEG+ RAW" means that both JPEG and RAW may be used as the file format. When "JPEG+RAW" is selected, the user selects any file format in which image data is to be saved, and inputs a selection instruction signal via the input unit 4. In addition, "JPEG/RAW" means that the file format of the recording medium 11 mounted to the first slot 7 is set to "JPEG", and the file format of the recording medium 12 mounted to the second slot 8 is set to "RAW".

The recording mode, the recording slot to be validated, and the file format are not necessarily configured to be independently selectable. When a type of any one item is selected, combinations of types that may be selected by other items are limited. Accordingly, when a type of one item is selected, for example, the display unit 5 displays only types that may be selected in the other items in correspondence to the selected type. FIG. 11 is a view illustrating various combinations that may be selected in three items. Hereinafter, the combinations of types that may be selected in the guide mode will be described with reference to FIG. 11.

(1) Standard Mode

The recording slot may be selected between "1" and "2". Any one of "JPEG", "RAW" and "JPEG+RAW" may be selected as the file format. In this case, a capturable number of sheets depending on a combination of a recording medium mounted to a recording slot and a file format that have been tentatively selected is displayed in the capturable number of sheets display section 134. When the selected file format is "JPEG+RAW", the capturable number of sheets is the amount obtained by dividing a remaining recordable capacity by a capacity sum of JPEG data and RAW data to be recorded at one-time capturing.

(2) Automatic Switching Mode

Only "1+2" may be selected as the recording slot, and any of "JPEG", "RAW" and "JPEG+RAW" may be selected as the file format. In this case, the total recordable number of sheets of the two recording media 11 and 12 each mounted to the two recording slots is displayed in the capturable number of sheets display section 134 depending on a combination of the file formats that has been tentatively selected.

(3) Individual [1] Mode

Only "1/2" may be selected as the recording slot. Any file format of "JPEG", "RAW" and "JPEG+RAW" may be selected as the file format individually for the two recording slots. For example, "JPEG/RAW" means that JPEG data is recorded in the recording medium 11 mounted to the first slot 7, and RAW data is recorded in the recording medium 12 mounted to the second slot 8. In addition, "JPEG+RAW/ JPEG" means that JPEG data and RAW data are recorded in the recording medium 11 mounted to the first slot 7, and JPEG data is recorded in the recording medium 12 mounted to the second slot 8. In this case, either one of the two recording media 11 or 12 with smaller capturable numbers of sheets is displayed in the capturable number of sheets display section 134 depending on a combination of the file formats that has been tentatively selected. Incidentally, the capturable number of sheets in the case where the selected file format is "JPEG+RAW" is the amount obtained by dividing a remaining recordable capacity by a capacity sum of JPEG and RAW to be recorded at one-time capturing.

(4) Individual [2] Mode

The same items as in the individual [1] may be selected as the recording slot and the file format. In this case, either one of the two recording media 11 or 12 with larger capturable numbers of sheets is displayed in the capturable number of sheets display section 134. The way of handling of the capturable number of sheets in the case where the selected file format is "JPEG+RAW" is the same as that of (3) described above. Incidentally, the capturable numbers of sheets of the two recording media 11 and 12 may be displayed together in the capturable number of sheets display section 134.

(5) Same [1] Mode

Only "1+2" may be selected as the recording slot, and any of "JPEG", "RAW" and "JPEG+RAW" may be selected as the file format. In this case, either one of the two recording media 11○12 with smaller capturable numbers of sheets is displayed in the capturable number of sheets display section 134 depending on a file format that has been tentatively selected. The way of handling of the capturable number of sheets in the case where the selected file format is "JPEG+ RAW" is the same as that of (3) described above.

(6) Same [2] Mode

Only "1/2" may be selected as the recording slot, and any of "JPEG", "RAW" and "JPEG+RAW" may be selected as the file format. In this case, either one of the two recording media 11 or 12 with larger capturable numbers of sheets is displayed in the capturable number of sheets display section 134. Incidentally, the capturable numbers of sheets of the two recording media 11 and 12 may be displayed together in the capturable number of sheets display section 134. The way of handling of the capturable number of sheets in the case where the selected file format is "JPEG+RAW" is the same as that of (3) described above.

After Step S32, when the input unit 4 receives input of a signal that confirms selection (Step S33: Yes), the recording control unit 93 performs setting of the recording mode (Step S34). Thereafter, the imaging device 1 is shifted to Step S14.

When the input unit 4 has not received the selection input in Step S31 (Step S31: No), and when the input unit 4 has not received the input of the signal of selection confirmation in Step S33 (Step S33: No), the imaging device 1 is shifted to Step S14.

Next, a description will be given regarding a case where the imaging device 1 is not set to the guide mode (Step S29: No) but set to a playback mode (Step S35: Yes). In this case, the display control unit 94 performs a thumbnail display in which thumbnails of image data to be recorded by the recording medium 11 or 12 are sequentially displayed on the display unit 5 (Step S36).

Next, when the input unit 4 receives input of selection on any one of the plurality of thumbnails displayed by the display unit 5 (Step S37: Yes), the display control unit 94 playback-displays a selected image on the display unit 5 (Step S38). When the input unit 4 has not received the input of selection on any one of the plurality of thumbnails displayed by the display unit 5 (Step S37: No), the imaging device 1 is shifted to Step S14.

After Step S38, when the input unit 4 receives input of a signal that instructs a change of an image to be played back (Step S39: Yes), the display control unit 94 playback-displays a changed image on the display unit 5 (Step S40). When the input unit 4 has not received the input of the signal that instructs the change of the playback image (Step S39: No), the imaging device 1 is shifted to Step S14.

Finally, a description will be given regarding a case where the imaging device 1 is not set to the playback mode in Step S35 (Step S35: No). In this case, the imaging device 1 is shifted to other modes that may be set. The other modes that may be set will not be described.

According to the above-described embodiment of the disclosure, the setting mode information relating to the set recording mode is displayed on the display unit in different display states depending on the recording modes, and thus, the user may flexibly and easily set the recording mode of the image data with respect to the two recording media.

In addition, the user may make the imaging device record image data in a desired recording mode without recognizing a master-slave relationship among the plurality of slots according to the present embodiment.

In addition, the icon to be displayed by the display unit is displayed in different states depending on the recording modes according to the present embodiment, and thus, the user may intuitively recognize the set recording mode.

In addition, the setting mode information and the recordable data amount information are displayed to be arranged side by side at the edge end portion of the screen of the display unit according to the present embodiment, and thus, it is possible to provide accurate information to the user by effectively utilizing a space at a peripheral edge portion.

In the description of the flowcharts in the present specification, the sequence of the processes among steps has been illustrated using the terms of "first", "thereafter", "next", and the like. However, the order of processes necessary for implementing the above-described embodiment is not uniquely determined by those terms. That is, the order of processes in the flowcharts described in the present specification may be changed in a scope without inconsistency.

In addition, the processing algorithm described with reference to the flowcharts in the present specification may be described as a program. Such a program may be recorded in a recording unit inside a computer or may be recorded in a computer-readable recording medium. The recording of the program in the recording unit or the recording medium may be performed when the computer or the recording medium is shipped as a product, or may be performed by downloading through a communication network.

According to an imaging device according to the disclosure, a user may flexibly and easily set a recording mode of image data with respect to a plurality of recording media.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
    an imaging unit configured to image a subject and generate image data;
    a display configured to display information including an image corresponding to the image data;
    a first recording slot mounting a first recording medium for recording the image data;
    a second recording slot mounting a second recording medium for recording the image data;
    a recording controller configured to set a recording mode between:
        an automatic switching mode in which recording of the image data is performed by repeatedly switching between the first and the second recording media in a predetermined order; and
        a simultaneous recording mode in which recording of the image data to the first and the second recording media is simultaneously performed;
    a display controller configured to display on the display setting mode information relating to the recording mode set by the recording controller in a different display mode for each recording mode; and
    the simultaneous recording mode further comprises:
        a first priority mode in which a recordable number of sheets of the first recording medium is compared with a recordable number of sheets of the second recording medium, and the display controller displays on the display the recordable number of sheets which is larger; and
        a second priority mode in which the recordable number of sheets of the first recording medium is compared with the recordable number of sheets of the second recording medium, and the display controller displays on the display the recordable number of sheets which is smaller.

2. The imaging device according to claim 1, wherein the display controller displays an icon in which a picture indicating a recording slot in middle of recording is positioned at a front side between two pictures indicating the first and second recording slots, and the two pictures are shifted to overlap each other, on the display as the setting mode information in the automatic switching mode, and displays an icon in which the pictures each indicating the first and second recording slots are arranged side by side on the display as the setting mode information in the simultaneous recording mode.

3. The imaging device according to claim 1, wherein the display controller changes a display mode of the setting mode information and displays the changed mode on the display when the recording medium in middle of recording is switched in the automatic switching mode.

4. The imaging device according to claim 1, wherein
the display controller causes the display to display the setting mode information in midst of live view display in which the image data thus generated are sequentially displayed.

5. The imaging device according to claim 1, wherein
the display controller displays a control panel indicating setting content of the imaging device on the display, and
the control panel includes a sharing display icon indicating sharing content of recording depending on the recording modes of the two recording media.

6. The imaging device according to claim 1, wherein
the display controller displays the setting mode information in an edge end portion of a screen of the display.

7. The imaging device according to claim 1, wherein
the recording controller calculates information on recordable data amount determined depending on the recording mode, and
the display controller displays the information on the recordable data amount on the display.

8. The imaging device according to claim 6, wherein
the display controller displays the information on the recordable data amount to be arranged side by side with the setting mode information on the display.

9. The imaging device according to claim 1, further comprising
an input unit configured to receive input of a signal from outside,
wherein the display controller displays information for setting of the recording mode on the display when the input unit receives input of a signal that instructs setting of the recording mode.

10. The imaging device according to claim 9, wherein
the information for setting includes recording mode information indicating a type of the recording mode, a recording slot information indicating a type of the recording slot that is valid, file format information indicating a file format of the image data, and information on recordable data amount which is determined depending on a combination of the recording mode, the recording slot, and the file format.

11. The imaging device according to claim 1, wherein in the first priority mode, recording the same image data to both the first recording medium and the second recording medium is prioritized.

12. The imaging device according to claim 1, wherein in the second priority mode, recording a maximum number of recordable sheets on at least one of the first recording medium and the second recording medium is prioritized.

13. An imaging device comprising:
an imaging unit configured to image a subject and generate pieces of image data;
a display configured to display information including an image corresponding to a selected piece of image data;
a first recording slot mounting a first recording medium for recording the pieces of image data, the first recording medium capable of recording a certain number of pieces of image data;
a second recording slot mounting a second recording medium for recording the pieces of image data, the second recording medium capable of recording a certain number of pieces of image data;
a recording controller configured to set a recording mode between:
  an automatic switching mode in which recording of image data is performed by repeatedly switching between the first and the second recording media in a predetermined order; and
  a simultaneous recording mode in which recording of image data to the first and the second recording media is simultaneously performed;
a display controller configured to display on the display setting mode information relating to the recording mode set by the recording controller in a different display mode for each recording mode; and
the simultaneous recording mode further comprises:
  a first priority mode in which recording the same image data to both the first recording medium and the second recording medium is prioritized, wherein in the first priority mode a recordable number of pieces of image data for the first recording medium is compared with a recordable number of pieces of image data for the second recording medium, and the display controller displays on the display the recordable number of pieces of image data which is larger; and
  a second priority mode in which recording a maximum number of recordable sheets on at least one of the first recording medium and the second recording medium is prioritized, wherein in the second priority mode the recordable number of pieces of image data for the first recording medium is compared with the recordable number of pieces of image data for the second recording medium, and the display controller displays on the display the recordable number of pieces of image data which is smaller.

* * * * *